United States Patent [19]

Ohkoshi et al.

[11] Patent Number: 4,948,537
[45] Date of Patent: Aug. 14, 1990

[54] METHOD OF PRODUCING A RESIN MOLD FOR REAR PROJECTION SCREEN

[75] Inventors: Akio Ohkoshi; Takuji Inoue, both of Tokyo; Eihachi Ogino; Tsutomu Nakazawa, both of Joetsu, all of Japan

[73] Assignees: Sony Corporation; Arisawa Mfg. Co., Ltd., both of Tokyo, Japan

[21] Appl. No.: 284,698

[22] Filed: Dec. 15, 1988

[30] Foreign Application Priority Data

Dec. 28, 1987 [JP]  Japan .................................. 336414

[51] Int. Cl.$^5$ ..................... B29C 33/40; B29C 33/42; B29D 11/00
[52] U.S. Cl. ..................................... 264/2.5; 264/102; 264/227
[58] Field of Search ................... 264/1.3, 1.7, 1.9, 2.5, 264/227, 102

[56] References Cited

U.S. PATENT DOCUMENTS 4,170,616  10/1979  Jebens .................................. 264/2.5
4,770,824   9/1988  Blom ................................... 264/2.5

FOREIGN PATENT DOCUMENTS 36415    3/1983   Japan ................................. 264/1.9
614459  12/1948   United Kingdom ................. 264/1.9
1147339  4/1969   United Kingdom .
1317005  5/1973   United Kingdom .
1317006  5/1973   United Kingdom .
1493115 11/1977   United Kingdom .
2037219  7/1980   United Kingdom .

Primary Examiner—James Lowe
Attorney, Agent, or Firm—Hill, Van Santen, Steadman & Simpson

[57] ABSTRACT

A method of producing a resin mold that includes the steps of pouring a first resin into a metal mold, curing the first resin at a first temperature thereby making an intermediate resin mold made of the first resin, separating the intermediate resin mold from the metal mold, pouring a second resin into the intermediate resin mold, curing the second resin at a second temperature thereby making a final resin mold made of the second resin and separating the final resin mold from the intermediate resin mold, wherein by selecting the first and second curing temperatures of the first and second resins, the final resin mold will have the same size as that of the metal mold.

10 Claims, 3 Drawing Sheets

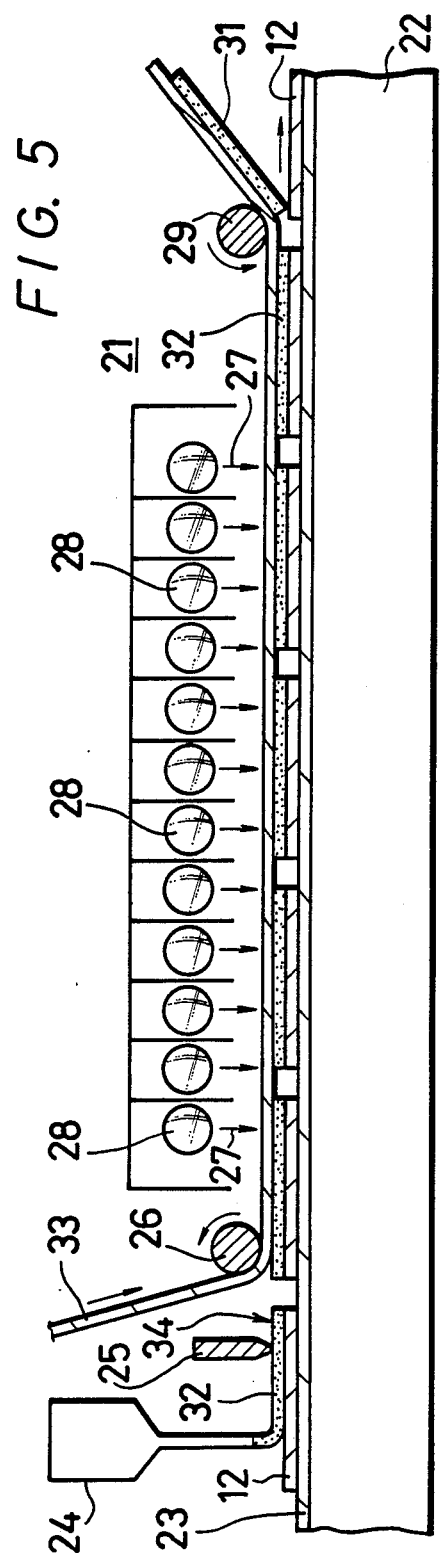
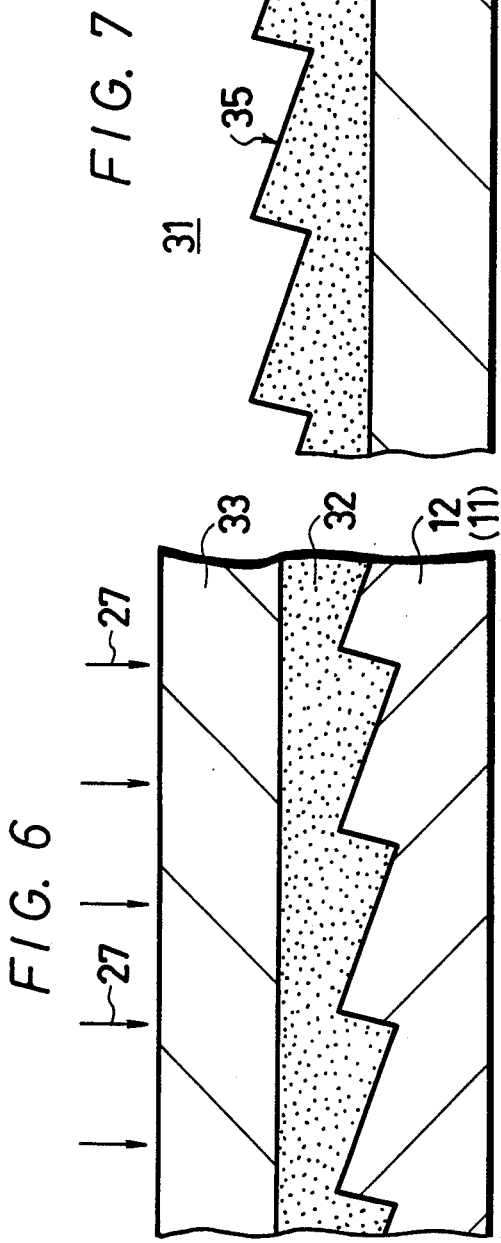

METHOD OF PRODUCING A RESIN MOLD FOR REAR PROJECTION SCREEN

BACKGROUND OF THE INVENTION

1. Field of the Invention

The present invention relates to a method for producing a resin mold that is used to produce a screen of, for example, a rear projection video apparatus.

2. Description of the Prior Art:

A transmission-type screen of, for example, a rear video projector is generally formed of a Fresnel lens and a lenticular lens. Also, the material forming such transmission-type screen contains a diffusion agent, such as $SiO_2$, $CaCO_3$. $Al_2O_3$, $TiO_2$, $BaSO_4$, $ZnO$, glass beads, an organic-system diffusion agent or the like so as to have a suitable diffusion property for the light which is incident thereon. The Fresnel lens has the function to refract diverged light from a projection lens toward a viewer. This Fresnel lens is formed of a methacrylic resin plate one side of which is formed a lens surface on which a number of concentric grooves of V-shaped configuration are formed. The other side is formed as a non-lens surface. Generally, a so-called hot press molding method is used to manufacture such a Fresnel lens screen.

According to the hot press molding method, the Fresnel lens screen is produced as follows. First, a metal mold is prepared. This metal mold is produced by cutting a copper plate or an aluminum alloy plate having a thickness of 10 to 20 mm by means of an NC (numerical control)-type cutting machine in such a manner that a plurality of concentric grooves of V configuration are formed on one side surface so as to form a pattern opposite to that of the desired Fresnel lens. Next, a metal plate whose surface is polished to a mirror surface is prepared. Then, a methacrylic resin plate having a thickness of 2 to 4 mm is sandwiched between the thus made metal mold and the metal plate with the mirror surface, and it is then heated and then molded with pressure so as to produce the Fresnel lens screen.

In another method an extrusion-process using a molding roller is employed to produce the lenticular lens screen.

When the above-mentioned transmission-type screen is mass-produced according to the hot press molding process, a number of metal molds which are cut are needed. Further, it takes 150 to 200 hours to finish one metal mold by the cutting process. Also, considering the yield in the cutting process and the life of the metal mold (the number of lens screens that can be made per one press) and so on, the cost of the metal mold amounts to a very large percentage of the manufacturing costs of the above-mentioned transmission-type screen.

OBJECTS AND SUMMARY OF THE INVENTION

Accordingly, it is an object of the present invention to provide an improved method of producing a resin mold that is used to produce a screen of a rear video projector.

It is another object of the present invention to provide a method of producing a resin mold for a rear projection screen which can make a resin mold which has excellent dimensional accuracy.

It is a further object of the present invention to provide a method of producing a resin mold for a rear projection screen which can considerably reduce the cost of the mold.

According to an aspect of the present invention, there is provided a method of producing a resin mold comprising the steps of:

(a) pouring a first resin into a metal mold, (b) curing said first resin at a first temperature thereby making an intermediate resin mold made of said first resin;

(c) separating said intermediate resin mold from said metal mold;

(d) pouring a second resin into said intermediate resin mold;

(e) curing said second resin at a second temperature thereby making a final resin mold made of said second resin; and (f) separating said final resin mold from said intermediate resin mold.

According to another aspect of the present invention, there is provided a method of producing a resin mold comprising the steps of:

(a) pouring a first resin into a metal mold which is set in a vacuum chamber;

(b) degassing said first resin by forming a vacuum in said vacuum chamber;

(c) setting a plate on the layer of said first resin;

(d) curing said first resin at a first temperature thereby making an intermediate resin mold made of said first resin;

(e) separating said intermediate resin mold from said metal mold;

(f) setting said intermediate resin mold in a vacuum chamber;

(g) pouring a second resin into said intermediate resin mold;

(h) degassing said second resin in said vacuum chamber;

(i) setting a plate on the layer of said second resin;

(j) curing said second resin at a second temperature thereby making a final resin mold made of said second resin; and (k) separating said final resin mold from said intermediate resin mold.

According to a further aspect of the present invention, there is provided a method of producing a resin mold for making a screen of a rear video projection apparatus, comprising the steps of:

(a) pouring a first resin into a metal mold on which a lens surface is formed;

(b) curing said first resin at a first temperature thereby making an intermediate resin mold;

(c) pouring a second resin into said intermediate resin mold; and (d) curing said second resin at a second temperature thereby making a final resin mold, wherein said first and second temperatures are set at predetermined values so as to make the size of said final resin mold substantially equal to that of said metal mold.

These, and other objects, features and advantages of the present invention will become apparent from the following detailed description of the preferred embodiment to be taken in conjunction with the accompanying drawings, in which like reference numerals identify like elements and parts.

BRIEF DESCRIPTION OF THE DRAWINGS

FIG. 5 is a cross-sectional view illustrating an example of an apparatus which produces a Fresnel lens screen by utilizing the resin mold produced in accordance with the manufacturing method of the present invention;

FIG. 6 is a cross-sectional view used to explain the method of producing the Fresnel lens screen; and FIG. 7 is a cross-sectional view of the Fresnel lens screen.

DETAILED DESCRIPTION OF THE PREFERRED EMBODIMENT

Now, an embodiment of the present invention will be described with reference to the drawings.

Figure 1:
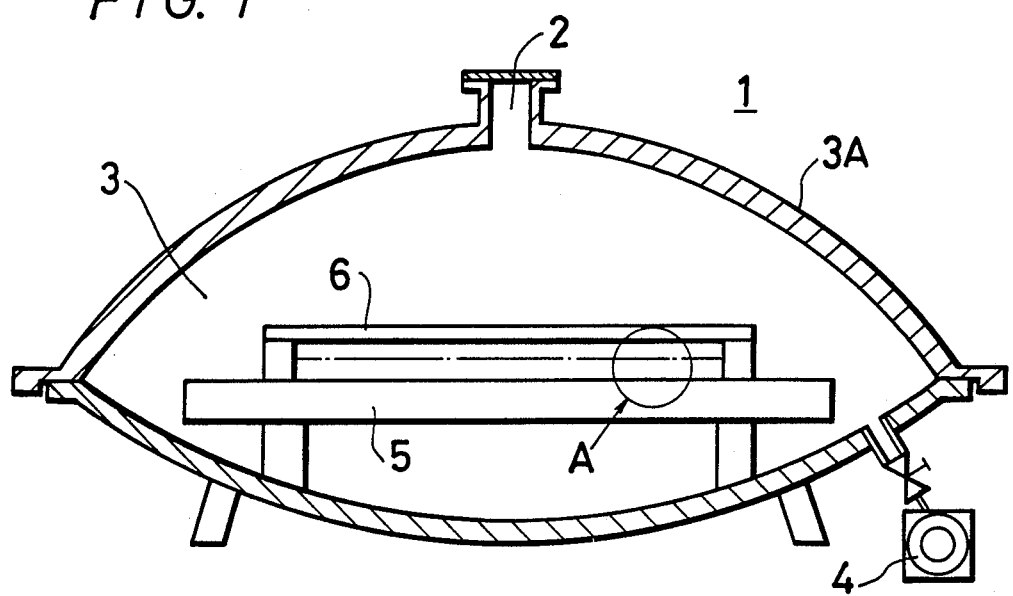
FIG. 1 is a diagram showing an apparatus for producing an intermediate mold according to the present invention.
Figure 2:
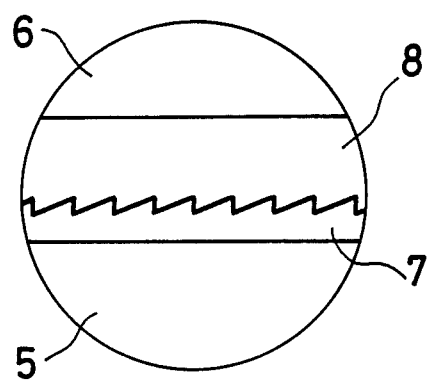
FIG. 2 is a fragmentary, enlarged view illustrating a main portion A of FIG. 1.

First, an intermediate mold for a Fresnel lens is produced by means of an apparatus respresented by reference numeral 1 in FIG. 1. FIG. 2 is a fragmentary, enlarged view illustrating a main portion of the mold which is encircled by reference letter A in FIG. 1.

Referring to FIG. 1, this apparatus 1 comprises a vacuum container 3A having a vacuum chamber 3 and a resin injection gate 2 through which a resin is injected. A vacuum pump 4 is provided for vacuumizing the vacuum chamber 3. A heating plate 5 is located within the vacuum chamber 3 and a smooth plate 6 is located within the vacuum chamber 3. To use this apparatus 1, on the heating plate 5, there is located a cutting metal mold (or so-called matrix) 7 on which a number of concentric grooves having V-shaped configuration which are opposite to the configuration of the Fresnel lens are formed by some suitable cutting means such as an NC-type cutting machine and so on. If a silicon resin of addition-polymerization type which has excellent mold release property, transfer property, dimensional stability, specular or mirror surface property or the like is used and the curing temperature of this silicon resin is selected to be at a predetermined temperature of, for example, T1° C., the cutting metal mold 7 and the molten silicon resin 8 is poured on or into the metal mold 7 and the molten silicon resin is maintained at T1° C. and a silicon resin 8 is poured on or into the metal mold 7 through the resin injection gate 2 of the vacuum container 3A. After the resin injection gate 2 has been closed, the vacuum pump 4 is operated to vacuumize the vacuum chamber 3 and the injected silicon resin 8 is defoamed or degassed under vacuum conditions so as to degass the bubbles contained in the silicon resin 8. After the degassing process is done by vacuumizing the vacuum, the vacuum chamber 3 is released, and then the smooth plate 6 such as a glass plate or the like is set on the upper surface of the silicon resin 8 so that the intermediate resin mold which is to be made may have a uniform thickness. Then, the injected silicon resin 8 is cured at a temperature of T1° C. maintained by the heating plate 5 and it is cured (by heat-treatment) at a T1° C. for 24 hours. Thereafter, the thus cured silicon resin 8 is released from the metal mold 7, thus an intermediate resin mold 9 made of the silicon resin is produced.

Figure 3:
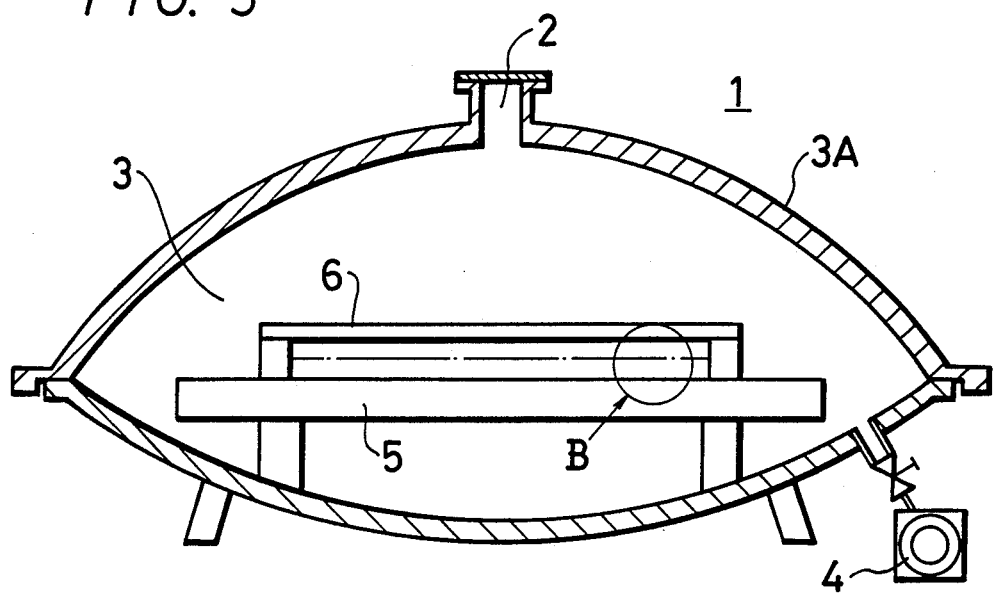
FIG. 3 is a diagram showing an apparatus for producing a resin mold according to the present invention.
Figure 4:
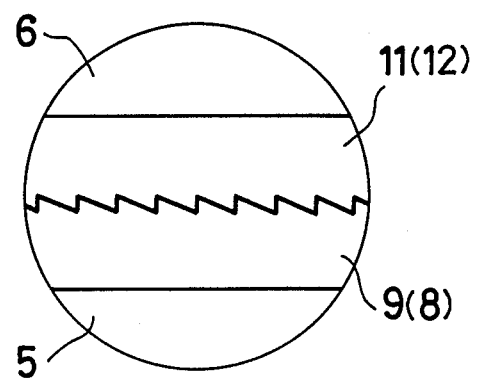
FIG. 4 is a fragmentary, enlarged view showing a main portion B of FIG. 3.

Next, as shown in FIGS. 3 and 4, apparatus 1 is used to produce a final resin mold from the intermediate resin mold 9. FIG. 4 is a fragmentary, enlarged view illustrating an encircled main portion B in FIG. 3. The process for producing the final resin mold is substantially the same as that for producing the intermediate resin mold 9. In this latter process, the resin employed is, for example, a bismaleimidetriazine resin because it has high strength and excellent heat-resistant properties, dimensional stability and so on. Referring to FIGS. 3 and 4, the intermediate resin mold 9 made of the above silicon resin is disposed on the heating plate 5 of the apparatus 1. If the curing temperature of the bismaleimidetriazine resin is determined to be a predetermined temperature, for example, T2° C., the intermediate resin mold 9 and the molten bismaleimidetriazine resin are previously maintained a temperature of T2° C. Then, a bismaleimidetriazine resin 11 is poured on or into the intermediate resin mold 9 through the resin injection gate 2 of the vacuum container 3A. After the resin injection gate 2 has been closed, the vacuum chamber 3 is vacuumized by the vacuum pump 4, and the thus injected bismaleimidetriazine resin 11 is degassed under the vacuum conditions so as to remove bubbles contained in the bismaleimidetriazine resin 11. After the degassing process has been performed, the vacuum in chamber 3 is released and a smooth plate 6 is set on the upper surface of the bismaleimidetriazine resin 11. Then, the bismaleimidetriazine resin 11 is cured at T2° C. with the heating plate 5 and is, pre-cured (by heat-treatment) at T2° C. for 14 hours and is then separated from the intermediate resin mold 9 so as to produce a final resin mold 12. The resin mold 12 is aged (so called after-cure process) at 150° C. for 24 hours to enhance the strength and dimensional stability. In this case, the specular property or mirror surface property and flatness of the resin mold deteriorated due to the rapid rise of the temperature so that the above-mentioned treatment is performed under such conditions that the temperature will rise at about 5° to 25° C./hour. The final resin mold 12 to be used for producing the Fresnel lens screen is produced in this manner.

The curing temperatures of the intermediate resin mold 9 and the final resin mold 12 are important factors so as to make the size of the final resin mold 12 equal to that of the cutted metal mold 7. The curing temperatures T1 and T2 are therefore calculated from the following equation (1) which is expressed as $$L' = \frac{L(1+(T1-T)K1)(1-A)(1+(T2-T1)K2)}{(1-B)} \quad (1)$$

where L' is the length (cm) of the final resin mold 12 at room temperature, L the length (cm) of the metal mold 7 at room temperature, T the room temperature, 25° C, T1 the curing temperature (° C.) of the intermediate resin mold 9, T2 the curing temperature (° C.) of the final resin mold 12, K1 the linear expansion coefficient (cm/cm° C.) of the metal mold 7, K2 the linear expansion coefficient (cm/cm/° C.) of the intermediate resin mold 9, A the molding shrinkage of the intermediate resin mold 9 and B the molding shrinkage of tHe resin mold 12.

From the above equation (1), it will be apparent that if the curing temperature T1 of the intermediate resin mold 9 and the curing temperature T2 of the final resin mold 12 are respectively suitably selected, or if one of these curing temperatures is selected to be a desired temperature and then the remaining curing temperature is selected on the basis of such curing temperature, it becomes possible to obtain the final resin mold which has a size which is substantially the same as that of the metal mold.

Thus, for example if, L is 100 cm, L' is 100 cm, T is 25° C., T1 is X° C., T2 is 60° C., K1 is $1.8 \times 10^{-5}$ cm/cm/° C. (brass), K2 is $2.5 \times 10^{-4}$ cm/cm/° C., A is $6.3 \times 10^{-4}$ and B is $5.6 \times 10^{-3}$, respectively. Then, the above-mentioned, equation (1) yields the curing temperature T1 of the intermediate resin mold 9 as 34° C.

The following table shows the measured results of how the sizes of the intermediate resin mold and the final resin mold were changed in the respective processes of this embodiment of the invention as compared to a case where the curing temperature, T1 of the intermediate mold 9 is selected to be 60° C. (a temperature equal to the curing temperature T2 of the final resin mold 12).

TABLE

|  | Tl = 34° C. | Tl = 60° C. |
| --- | --- | --- |
| Size of metal mold | 100.0 cm | 100.0 cm |
| Size of intermediate resin mold | 99.71 cm | 99.08 cm |
| Size of final resin mold (after the pre-cure process) | 100.15 cm | 99.58 cm |
| Size of final resin mold (after the after-cure process) | 100.0 cm | 99.40 cm |

According to the method of producing the resin mold 12, the intermediate resin mold 9 is made of a flexible thermosetting resin such as silicon resin, and the resin mold 12 is made of a thermosetting resin which has a high strength and heat-resistant property such as the bismaleimidetriazine resin. In addition, the casting temperatures for producing the molds, i.e., the curing temperatures T1 and T2 are properly selected with the result that the size of the resin mold 12 can be made equal to that of the cutted metal mold 7. Further, according to the manufacturing method of the present invention, by working only one side surface of the expensive cutted metal mold 7 a number of the resin molds 12 can be produced, thus making it possible to considerably reduce the cost of the molds.

An example of the method for producing a Fresnel lens screen by using the thus made resin mold 12 will be described. Fresnel lens screen can be made by a method similar to the method that the assignee of the present application has previously proposed (see Japanese Patent Application No. 61-214932).

FIG. 5 schematically illustrates an apparatus 21 that can successively produce the Fresnel lens screens. Referring to FIG. 5, this apparatus 21 comprises a base table 22, a conveyor 23 located on the base table 22, a resin feeder 24, a doctor knife or blade 25, a pressure roller 26 extra-high voltage mercury lamps or metal halide lamps 28 for irradiating ultraviolet rays 27 and a roller 29 for separating the screen from the mold. The thus produced resin molds, i.e., the resin molds 12, each having the lens surface whose pattern is exactly opposite to that of the Fresnel lens, are spaced on the conveyor 23 with a predetermined spacing therebetween.

From the resin feeder 24, a molten ultraviolet ray hardening type resin 32 is fed onto the resin mold 12 which is being conveyed on the conveyor 23 and the thickness of the ultraviolet ray hardening-type resin 32 coated on the resin mold 12 is made uniform by the doctor knife 25. The coating thickness of the resin 32 might fall in a proper range such as 0.10 to 250 mm. If the coating thicknesss is insufficient, the thickness of the resin 32 is not uniform, while if the coating thickness is too great, the irradiation time of the ultraviolet rays 27 thereon must be substantially increased. When the resin 32 is coated onto the surface of the resin mold 12, the resin 32 has to be carefully protected from containing bubbles in order to prevent so-called pinhole. from resulting in a screen which is to be made. To solve this problem of pinholes, the viscosity of the ultraviolet ray hardening-type resin 32 is adjusted so as to fall in a range of 500 to 2000 cps. Then, the bubbles which are contained in the resin 32 are degassed under vacuumized conditions before the resin 32 is coated onto the resin mold 12. A 50 to 300 μm thick back-film 35 such as a polyester film, an acetate film or the like fed from above is deposited on an upper surface 34 of the coated resin 32 by means of the pressure roller 26. The back-film 33 is deposited on the upper surface 34 of the coated resin 32 so as to isolate the resin 32 from air (especially oxygen). As shown in FIG. 5 and FIG. 6 which is a fragmentary, enlarged sectional view of FIG. 5, the resin 32 with the back-film 33 deposited thereon is conveyed under the extra-high voltage mercury lamps or metal halide lamps 28 that are used as the light sources for irradiating with ultraviolet rays. Under these conditions, the ultraviolet rays 27 irradiate the resin 32 at an intensity of 2 mW/cm² for 5 minutes on the surface of resin 32 which is to be irradiated, and thus the resin 32 is hardened or cured. After the hardening process with the ultraviolet rays 27 has been finished, a Fresnel lens screen 31 made of the resin 32 is separated from the resin mold 12 by the mold releasing or separating roller 29. Thereafter, the back film 33 is cut to divide it, thus producing the Fresnel lens screen 31 shown in FIG. 7 In FIG. 7, reference numeral 35 designates a Fresnel lens surface While in the above embodiment the method of the invention is applied to the process for producing the resin mold which is used to produce a Fresnel lens screen, the resin mold of the present invention can be similarly applied to a process for producing a resin mold which is used to produce the lenticular lens screen.

Further, the present invention is not limited to the method of producing the resin mold for making the transmission type screen and a reflection type screen but can also be applied to a method of producing other resin molds for producing light receiving Fresnel lens and so on.

According to the method for producing a resin mold for a screen of a rear video projection apparatus of the present invention, since the intermediate resin mold is only once produced from the metal mold that serves as the matrix. The final resin mold is produced from this intermediate resin mold and during the production of the molds, the curing temperatures of the intermediate resin mold and the final resin mold are properly selected. The desired final resin mold has a size which is substantially equal to that of the metal mold. Further, according to the method of the present invention, since a number of the resin molds can be made with excellent dimensional accuracy by working on only one side surface of the expensive metal mold, the cost of the mold can be reduced considerably.

Therefore, the method of the present invention is particularly suitable for producing a mold which is used to produce a screen of video projector that requires a high accuracy.

It should be understood that the above description is presented by way of example for a single preferred embodiment of the invention and it will be apparent that many modifications and variations thereof could be effected by one with ordinary skill in the art without departing from the spirit and scope of the novel concepts of the invention so that the scope of the invention should be determined only by the appended claims.

We claim as our invention:

1. A method of producing a resin mold comprising the steps of:
   (a) pouring a first resin into a metal mold having a reverse pattern;
   (b) curing said first resin at a first temperature thereby making an intermediate resin mold made of said first resin;
   (c) separating said intermediate resin mold from said metal mold;
   (d) pouring a second resin into said intermediate resin mold;
   (e) curing said second resin at a second temperature thereby making said resin mold made of said second resin;
   (f) separating said resin mold from said intermediate resin mold, in which said first and second temperatures are set at predetermined temperatures, respectively, so as to make the size of said resin mold substantially equal to that of said metal mold, and in which said first and second temperatures are set so as to make L'/L = 1 in the following equation:

$$L' = \frac{L(1+(T1-T)K1)(1-A)(1+(T2-T1)K2)}{(1-B)}$$

wherein L' represents the length (cm) of the resin mold at room temperature, L the length (cm) of the metal mold at room temperature, T the room temperature of 25°C., T1 the curing temperature (°C.) of the intermediate resin mold, T2 the curing temperature (°C.) of the resin mold, K1 the linear expansion coefficient (cm/cm/°C.) of the metal mold, K2 the linear expansion coefficient (cm/cm/°C.) of the intermediate resin mold, A the molding shrinkage of the intermediate resin mold and B the molding shrinkage of the resin mold.

2. A method according to claim 1, in which a Fresnel lens surface is formed on said metal mold.

3. A method of producing a resin mold comprising the steps of:
   (a) pouring a first resin into a metal mold having a reverse pattern;
   (b) curing said first resin at a first temperature thereby making an intermediate resin mold made of said first resin;
   (c) separating said intermediate resin mold from said metal mold;
   (d) pouring a second resin into said intermediate resin mold;
   (e) curing said second resin at a second temperature thereby making said resin mold made of said second resin;
   (f) separating said resin mold from said intermediate resin mold, and in which said first resin is silicon and said second resin is bismaleimidetriazine.

4. A method of producing a resin mold comprising the steps of:
   (a) pouring a first resin into a metal mold which is set in a vacuum chamber;
   (b) degassing said first resin by vacuumizing said vacuum chamber;
   (c) setting a plate on the layer of said first resin;
   (d) curing said first resin at a first temperature thereby making an intermediate resin mold made of said first resin;
   (e) separating said intermediate resin mold from said metal mold;
   (f) setting said intermediate resin mold in a vacuum chamber;
   (g) pouring a second resin into said intermediate resin mold;
   (h) degassing said second resin by vacuumizing said vacuum chamber;
   (i) setting a plate on the layer of said second resin;
   (j) curing said second resin at a second temperature thereby making said resin mold made of said second resin; and
   (k) separating said resin mold from said intermediate resin mold.

5. A method according to claim 4, in which a Fresnel lens surface is formed on said metal mold.

6. A method of producing a resin mold comprising the steps of:
   (a) pouring a first resin into a metal mold which in set in a vacuum chamber;
   (b) degassing said first resin by vacuumizing said vacuum chamber;
   (c) setting a plate on the layer of said first resin;
   (d) curing said first resin at a first temperature thereby making an intermediate resin mold made of said first resin;
   (e) separating said intermediate resin mold from said metal mold;
   (f) setting said intermediate resin mold in a vacuum chamber;
   (g) pouring a second resin into said intermediate resin mold;
   (h) degassing said second resin by vacuumizing said vacuum chamber;
   (i) setting a plate on the layer of said second resin; and in which said first and second temperatures are set so as to make L'/L=1 in the following equation:

$$L' = \frac{L(1+(T1-T)K1)(1-A)(1+(T2-T1)K2)}{(1-B)}$$

wherein L' represents the length (cm) of the resin mold at room temperature, L the length (cm) of the metal mold at room temperature, T the room temperature of 25° C., T1 the curing temperature (°C.) of the intermediate resin mold, T2 the curing temperature (°C.) of the resin mold, K1 the linear expansion coefficient (cm/cm/°C.) of the intermediate resin mold, A the molding shrinkage of the metal mold, K2 the linear expansion coeficient (cm/cm/°C.) of the intermediate resin mold and B the molding shrinkage of the resin mold.

7. A method of producing a resin mold comprising the steps of:
   (a) pouring a first resin into a metal mold which is set in a vacuum chamber;

(b) degassing said first resin by vacuumizing said vacuum chamber;
(c) setting a plate on the layer of said first resin;
(d) curing said first resin at a first temperature thereby making an intermediate resin mold made of said first resin;
(e) separating said intermediate resin mold from said metal mold;
(f) setting said intermediate resin mold in a vacuum chamber;
(g) pouring a second resin into said intermediate resin mold;
(h) degassing said second resin by vacuumizing said vacuum chamber;
(i) setting a plate on the layer of said resin;
(j) curing said second resin at a second temperature thereby making said resin mold made of said second resin
(k) separating said resin mold from said intermediate resin mold, and in which said first resin is silicon and said second resin is bismaleimidetriazine.

8. A method of producing a resin mold for making a screen of a rear video projection apparatus, comprising the steps of:
   (a) pouring a first resin into a metal mold on which a lens surface is formed;
   (b) curing said first resin at a first temperature thereby making an intermediate resin mold;
   (c) pouring a second resin into said intermediate resin mold;
   (d) curing said second resin at a second temperature thereby making a resin mold, wherein said first and second temperatures are set at predetermined values so as to make the size of said resin mold substantially equal to that of said metal mold, and in which said first and second temperatures are set so as to make L'/L=1 in the following equation:

$$L' = L(1+(T1-T)K1)(1-A)(1+(T2-T1)K2) \quad (1B)$$

wherein L' represents the length (cm) of the resin mold at room temperature, L the length (cm) of the metal mold at room temperature, T the room temperature of 25° C., T1 the curing temperature (°C.) of the intermediate resin mold, T2 the curing temperature (°C.) of the resin mold, K1 the linear expansion coefficient (cm/cm/°C.) of the intermediate resin mold, A the molding shrinkage of the metal mold, K2 the linear expansion coefficient (cm/cm/°C.) of the intermediate resin mold and B the molding shrinkage of the resin mold.

9. A method of producing a resin mold for making a screen of a rear video projection apparatus, comprising the steps of:
   (a) pouring a first resin into a metal mold on which a lens surface is formed;
   (b) curing said first resin at a first temperature thereby making an intermediate resin mold;
   (c) pouring a second resin into said intermediate resin mold;
   (d) curing said second resin at a second temperature thereby making a resin mold, wherein said first and second temperatures are set at predetermined values so as to make the size of said resin mold substantially equal to that of said metal mold, and in which said first resin is silicon and said second resin is bismaleimidetriazine.

10. A method according to claim 9, in which said lens is a Fresnel lens.

* * * * *